United States Patent
Levy

(10) Patent No.: US 8,681,980 B2
(45) Date of Patent: *Mar. 25, 2014

(54) RECOVERABLE DIGITAL CONTENT DEGRADATION

(75) Inventor: Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 366 days.

This patent is subject to a terminal disclaimer.

(21) Appl. No.: 13/013,447

(22) Filed: Jan. 25, 2011

(65) Prior Publication Data

US 2011/0182564 A1 Jul. 28, 2011

Related U.S. Application Data

(63) Continuation of application No. 11/096,225, filed on Mar. 30, 2005, now Pat. No. 7,876,899, which is a continuation of application No. 09/522,678, filed on Mar. 10, 2000, now Pat. No. 6,963,884.

(60) Provisional application No. 60/123,581, filed on Mar. 10, 1999.

(51) Int. Cl.
  *H04N 7/167* (2011.01)

(52) U.S. Cl.
  USPC ........................................................ 380/228

(58) Field of Classification Search
  USPC .......... 380/210, 227, 228, 201; 713/176, 180, 713/181
  See application file for complete search history.

(56) References Cited

U.S. PATENT DOCUMENTS

| | | | |
|---|---|---|---|
| 3,478,166 | A | 11/1969 | Court et al. |
| 5,010,405 | A | 4/1991 | Schreiber et al. |
| 5,515,451 | A | 5/1996 | Tsuji et al. |
| 5,530,759 | A | 6/1996 | Braudaway et al. |
| 5,568,570 | A | 10/1996 | Rabbani |
| 5,630,044 | A | 5/1997 | Suzuki |
| 5,636,292 | A | 6/1997 | Rhoads |
| 5,646,997 | A | 7/1997 | Barton |

(Continued)

FOREIGN PATENT DOCUMENTS

| | | |
|---|---|---|
| EP | 0651554 | 5/1995 |
| GB | 2346110 | 8/2000 |
| WO | WO02/03385 | 1/2002 |
| WO | WO02/39719 | 5/2002 |

OTHER PUBLICATIONS

Mintzer et al., "Safeguarding Digital Library Contents and Users," D-Lib Magazine, Dec. 1997, 12 pages.

(Continued)

*Primary Examiner* — Beemnet Dada
(74) *Attorney, Agent, or Firm* — Digimarc Corporation

(57) ABSTRACT

The disclosure relates generally to processing audio and video signals. One claim recites an apparatus comprising: electronic memory for storing a media signal, the media signal comprising degradation introduced through use of a key, in which the key corresponds to detection criteria in the media signal, and in which the degradation comprises human perceptible degradation, the media signal further comprising the key embedded therein; and a processor programmed for: analyzing the media signal to obtain the key; and removing some of the degradation through use of the key, in which said removing utilizes different detection criteria relative to a process that introduced the degradation into the media signal. Of course, other claims and combinations are provided too.

8 Claims, 1 Drawing Sheet

(56) References Cited

U.S. PATENT DOCUMENTS

| | | | |
|---|---|---|---|
| 5,719,937 | A | 2/1998 | Warren et al. |
| 5,721,788 | A | 2/1998 | Powell et al. |
| 5,768,426 | A | 6/1998 | Rhoads |
| 5,778,055 | A | 7/1998 | Paneth et al. |
| 5,805,700 | A | 9/1998 | Nardone et al. |
| 5,875,249 | A | 2/1999 | Mintzer et al. |
| 5,912,972 | A | 6/1999 | Barton |
| 5,930,369 | A | 7/1999 | Cox et al. |
| 5,943,422 | A | 8/1999 | Van Wie et al. |
| 5,963,909 | A | 10/1999 | Warren et al. |
| 6,021,196 | A | 2/2000 | Sandford, II et al. |
| 6,021,391 | A | 2/2000 | Shyu |
| 6,044,182 | A | 3/2000 | Daly et al. |
| 6,049,627 | A | 4/2000 | Becker et al. |
| 6,061,793 | A | 5/2000 | Tewfik et al. |
| 6,266,412 | B1 | 7/2001 | Berenzweig et al. |
| 6,278,791 | B1 | 8/2001 | Honsinger et al. |
| 6,311,214 | B1 | 10/2001 | Rhoads |
| 6,366,685 | B1 | 4/2002 | Takaragi |
| 6,490,681 | B1 | 12/2002 | Kobayashi et al. |
| 6,515,755 | B1 | 2/2003 | Hasegawa |
| 6,523,113 | B1 | 2/2003 | Wehrenberg |
| 6,539,095 | B1 | 3/2003 | Rhoads |
| 6,560,349 | B1 | 5/2003 | Rhoads |
| 6,577,746 | B1 | 6/2003 | Evans et al. |
| 6,587,821 | B1 | 7/2003 | Rhoads |
| 6,611,812 | B2 | 8/2003 | Hurtado et al. |
| 6,674,861 | B1 | 1/2004 | Xu et al. |
| 6,839,673 | B1 | 1/2005 | Choi et al. |
| 6,888,943 | B1 | 5/2005 | Lam et al. |
| 6,963,884 | B1 | 11/2005 | Levy |
| 7,499,564 | B2 | 3/2009 | Rhoads |
| 7,876,899 | B2 * | 1/2011 | Levy .......................... 380/228 |
| 2002/0027994 | A1 | 3/2002 | Katayama et al. |
| 2002/0037091 | A1 | 3/2002 | Terasaki |
| 2002/0040323 | A1 | 4/2002 | Lee et al. |
| 2002/0049580 | A1 | 4/2002 | Kutaragi et al. |
| 2002/0059522 | A1 | 5/2002 | Hirano et al. |
| 2002/0071556 | A1 | 6/2002 | Moskowitz et al. |
| 2002/0073319 | A1 | 6/2002 | Manabe |
| 2002/0080964 | A1 | 6/2002 | Stone et al. |
| 2002/0126762 | A1 | 9/2002 | Tanaka |
| 2002/0154778 | A1 | 10/2002 | Mihcak et al. |
| 2003/0202681 | A1 | 10/2003 | Evans et al. |
| 2004/0015362 | A1 | 1/2004 | Rhoads |

OTHER PUBLICATIONS

"Windows XP Can Secure Music," by Brad King in Wired News, Feb. 13, 2001 (3 pages).

Boucqueau et al., Equitable Conditional Access and Copyright Protection for Image Based on Trusted Third Parties, Teleservices & Multimedia Communications, 2nd Int. Cost 237 Workshop, Second International COST 237 Workshop, Nov. 1995; published 1996, pp. 229-243.

Sep. 8, 2008 Notice of Allowance; Jun. 30, 2008 Amendment accompanying RCE; Jan. 31, 2008 Office Action; Nov. 16, 2007 Amendment; Jul. 16, 2007 Office Action; Oct. 27, 2006 Amendment; and Jul. 27, 2006 Office Action; Mar. 5, 2003 Transmittal letter; all from assignee's U.S. Appl. No. 10/383,156 (issued as US Patent No. 7,499,564).

Jul. 27, 2004 Notice of Allowance; Mar. 23, 2004 Notice of Allowance; Jan. 23, 2004 Amendment accompanying RCE; Jun. 23, 2003 Office Action; Feb. 26, 2003 Amendment; Feb. 3, 2003 Amendment; Aug. 1, 2002 Office Action; all from assignee's U.S. Appl. No. 09/522,678 (now U.S. Patent No. 6,963,884).

U.S. Appl. No. 60/123,581, filed Mar. 10, 1999.

Oct. 6, 2005 Notice of Abandonment and Mar. 24, 2005 Office Action; all from U.S. Appl. No. 09/931,374 (published as US 2002-0027994 A1).

Eric Metois, Ph.D, "Audio Watermarking and Applications," Sep. 1999, http://www.metois.com/Docs/audiowatermark.pdf [downloaded from web on Apr. 1, 2009].

Bruce Schneier, 1996, John Wiley & Sons, Inc. Applied Cryptography, pp. 455-457.

* cited by examiner

RECOVERABLE DIGITAL CONTENT DEGRADATION

This application is a continuation of Ser. No. 11/096,225, filed Mar. 30, 2005 (now U.S. Pat. No. 7,876,899), which is a continuation of U.S. patent application Ser. No. 09/522,678, filed Mar. 10, 2000 (now U.S. Pat. No. 6,963,884), which claims the benefit of U.S. Provisional Patent Application No. 60/123,581, filed Mar. 10, 1999. Each of the above patent documents is herein incorporated by reference.

BACKGROUND

It is desirable to degrade digital signals in many situations so as to restrict access. For instance, pay-TV broadcasts are degraded so those who haven't paid for the program cannot watch it because the picture is unclear, while those who have paid for the program see a clear picture because their recovery apparatus has been enabled. Most recently, as a result of the digital audio revolution, it is desirable to restrict MP3 (a standard bit-rate compressed audio file format) access. It is also desirable to produce inexpensive portable MP3 players, which in turn require that recovery of the original signal be simple.

There are numerous existing methods of degrading digital content, a.k.a. scrambling. Some methods require a key to de-scramble the content, whereas others do not. Most scrambling or degrading methods are based upon either adding an interference signal to the digital content, or moving the bits around. Other methods use encryption, but this is very computationally intense.

SUMMARY

This disclosure discusses degrading digital signals and recovering them using a method and corresponding apparatus that is extremely simple and efficient to implement. In addition, most configurations of the invented method and apparatus allow self-synchronization, which means the digital content can be recovered when accessed at any random part of the content. The invented process also has configurations where the original digital data can be recovered from the degraded digital data with or without the need for a key. Finally, the degradation level can be controlled such that the digital content can either be previewed in lower quality before buying, or made totally useless.

The invented degradation process involves searching through the original digital data for detection criteria and then adjusting neighboring points to degrade the content, either without affecting the location of the detection criteria or affecting it in a known fashion so that the original signal may be recovered. The detection criteria may include the relationship between several points, or be as simple as a threshold crossing or include every $M^{th}$ point. The adjustment of the neighboring points may be as simple as multiplying the point after the threshold crossing by N. It is advantageous if N is less than one but not equal to zero so saturation and data points equal to zero are not a problem, and if the threshold is positive and the data is decreasing towards zero during the threshold crossing.

The invented recovery process includes searching through the data for the detection criteria and then re-adjusting neighboring points to their original value. For example, if the adjustment in the degradation process uses multiplication by N, the recovery process multiplies by 1/N.

The corresponding apparatus includes a logical processor and memory unit. The logical processor is used to search for the detection criteria, then either adjust to degrade or re-adjust to recover the original data point(s). The memory unit is used to hold the previous point(s) necessary to find the criteria location, and the buffer, if using buffered data.

DETAILED DESCRIPTION

Below please find the definitions to terms and concepts that are used throughout this document. Digital content refers to digital data representing a perceived physical item, including but not limited to audio, video, and images. Digital data refers to the grouping of bits (1's or 0's) that represent a sample of the original digital content at an instant in time. Each bit group is equivalently referred to as a data point or sample. The data points are arranged in an order, many times representing a sequence versus time or frequency. In addition, the data points may be grouped again to form a subgroup, possibly used to represent a sequence versus frequency versus time, as is the case in MPEG standard compressed digital audio and video. Most importantly, the digital data has an order, with a beginning and end, such that searching the data is possible, and neighboring points can be defined as points close to each other. Finally, point(s) refer to one or several points.

Figure 1:
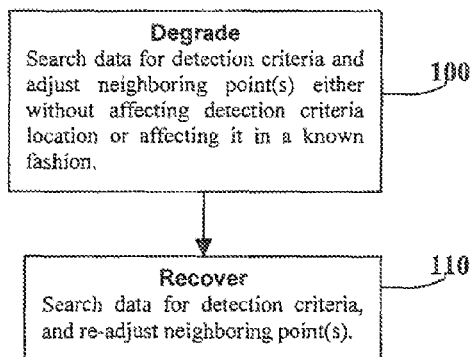
FIG. 1 is an overview of the degradation and recovery process.
Figure 2:
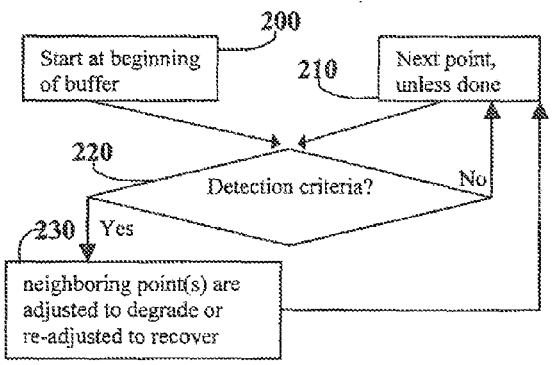
FIG. 2 is the pseudocode for the degradation and recovery process.

FIG. 1 displays an overview of the degradation and recovery process, and FIG. 2 displays the corresponding pseudocode to be implemented by the apparatus.

To degrade the digital content (box 100), the samples are searched for the detection criteria (boxes 200, 210 and 220). The searching stops after the last data point in the buffer has been examined (box 210), and a new buffer may be presented if available. As known in the state of the art, data values must be saved between buffers and properly initialized for the first buffer so as the initial points are properly searched.

When the detection criteria are found, the neighboring data point(s) are adjusted so as to cause content degradation (box 230). The adjustment of these points should not change the location of the detection criteria or change it in a known fashion; otherwise, the detection of the correct location to re-adjust the data to its original value (recovery) is not easy. In addition, it is desirable to prevent the adjustment from causing saturation or resulting in a value of zero, because then the original data point(s) will not be easily recoverable.

To recover the original digital content (box 110), the degraded data is searched for the detection criteria defined by the degradation process (box 200, 210, and 220). If the degradation process has changed the detection criteria in a known fashion, then the detection criteria in box 220 for recovery is different than that used in degradation. When the criteria location is found, the neighboring data point(s) are re-adjusted by the inverse of the method used in the degradation process (box 230).

Figure 3:
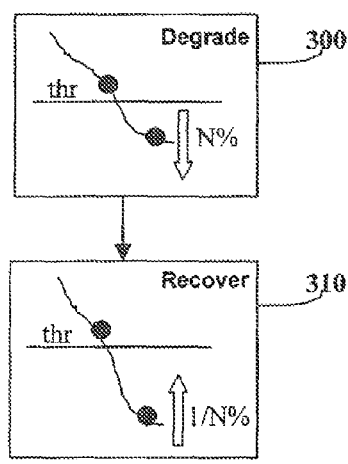
FIG. 3 is a simple and efficient example of the degradation and recovery process using a threshold crossing and adjusting only the next point.
Figure 4:
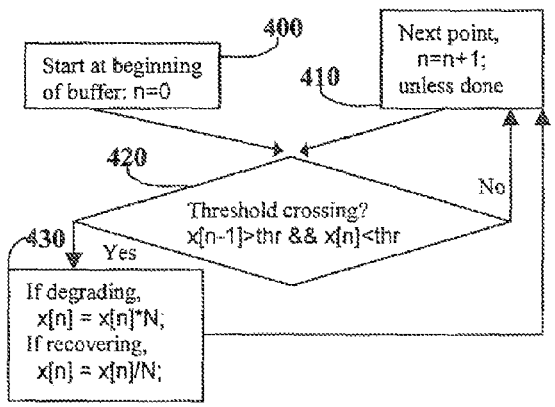
FIG. 4 is the pseudocode for the simple and efficient example of the degradation and recovery process.

An example of this process is shown in FIGS. 3 and 4. In this case (boxes 300 and 310), the detection criterion is a threshold crossing (using c-notation: x[n−1]>thr && x[n]<thr) with a positive threshold (thr>0) while the data goes towards zero (boxes 400, 410 and 420). The neighboring point(s) include only the point after the threshold crossing (box 430). To degrade the data, the adjustment involves multiplying the data point after the threshold crossing (x[n]) by N, where N is less than 1 (box 430). By reducing the value of this data point, the detection criteria location is not changed. In addition, the closer N is to 0 (but not equal to 0), the more the digital content is degraded. To recover the original digital data, the point after the threshold crossing (x[n]) is multiplied by 1/N (box 430). Care has to be taken that quantization errors do not degrade the recovered content quality. Obviously, without quantization, the recovered content will be identical to the original content.

There are additional simplistic detection criteria that can be used. For example, every $M^{th}$ data point may be degraded. In this case, synchronization for recovery may require scanning the data for M points until the correct degraded locations are found. In addition, peak values could be used, and the point after the peak could be reduced in value. As desired, this will not affect the detection criteria for the recovery process. Alternatively, threshold crossings with a negative threshold and the data moving towards zero are viable. Again, the data point after the threshold is reduced in absolute value towards but not equal to zero. For these last two cases, synchronization for recovery automatically occurs when searching the data.

Although, in this preferred configuration, the detection criteria do not change between degrading and recovering the original digital data, this is not an absolute requirement. The detection criteria may change, if in a known fashion, such that the recovery process uses a different but known detection criteria than the degradation process. In other words, box 420 (or 220, as discussed above) would be different for the degradation and recovery process.

The original content need not be represented by digital samples versus time, as one may have assumed. In many cases, such as using MPEG compression (i.e. MP3 audio), the digital samples represent subgroups of frequencies versus time. In this case the data may be searched across frequency for each subgroup, or across time for each frequency, or in any other but well-defined combination. The data may also represent either the frequency magnitude or corresponding scaling factors.

It is important to note that there are alternative ways to recover the content while removing most of the perceptual degradation caused by this degradation technique. For example, a pirate could use a low-pass filter to render reasonable content from the degraded content. The recovered digital data will not exactly match the original digital data, but its perception may be acceptable. As well know by one familiar with the state of the art in DSP, filter characteristics such as type and order will affect the recovered data.

Alternatively, one could use pseudo-random sequences (a.k.a. a key) to set the detection criteria (box 220) or the adjustment or re-adjustment of the data (box 230). This randomness increases the difficulty to illegally recover the data. For example, a pseudo-random number greater than zero but less than one could be used as the scaling value N (box 430). Or, a pseudo-random number between minimum and maximum threshold could be used for the threshold (box 420). All that matters is that the degradation and recovery process use the same pseudo-random sequence. However, this configuration requires sending a key along with the data. The key may be embedded within the data using known techniques, such that the original data is still recoverable from the degraded data.

Figure 5:
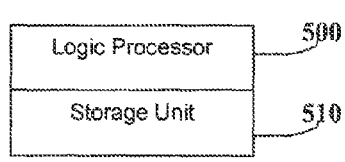
FIG. 5 is an overview of the apparatus required to implement the invented process.

FIG. 5 shows the hardware apparatus required to implement the invented degradation and recovery processes. The hardware includes a logic processor 500 and a storage unit 510. The logic processor 500 may be defined as the equivalent of a digital signal processor (DSP), general-purpose central processing unit (CPU), or a specialized CPU, including but not limited to media processors. A likely DSP chip is one of the Texas Instruments TMS320 product line. A CPU could include one of Intel's Pentium line or Motorola/IBM's PowerPC product line. The design of code for controlling logic processor 500 is simple for someone familiar with the state of the art given the above pseudo-code and description. The storage unit 510 includes RAM when using a digital processor, and is required to store the current buffer and/or previous point(s) for the detection criteria.

In addition, a person familiar with the state of the art could implement the logic processor 500 with analog and digital circuitry, either separately or in an application specific integrated circuit (ASIC). The analog and digital circuitry could include any combination of the following devices: digital-to-analog converters (D/A), comparators, sample-and-hold circuits, delay elements, analog-to-digital converters (A/D), and programmable logic controllers (PLC).

In summary, the main advantage of this technology is that it is an extremely simple and efficient method and apparatus to protect content as compared to prior-art scrambling and encryption methods.

The foregoing descriptions of the preferred embodiments of the technology have been presented to teach those skilled in the art how to best utilize the invention. Many modifications and variations are possible in light of the above teaching. For example, as discussed, there are many detection criteria and adjustment schemes that are similar to those described. To this end, the following claims define the scope and spirit of the currently claimed invention.

What is claimed is:

1. An apparatus comprising:
    electronic memory for storing a media signal, the media signal comprising embedded degradation data therein, the degradation data having a signal level that is perceptible to a human observer of the media signal when rendered unless removed, in which the media signal remains perceptibly discernible to the human observer despite embedded degradation data,
    an input to receive a specific key, the specific key providing self-synchronization allowing for removal of the degradation data including removal when the media signal is accessed randomly;
    a processor programmed for removing the embedded degradation data using the specific key to reduce the perceptibility of the degradation data at rendering.

2. The apparatus of claim 1 in which the media signal comprises audio or video.

3. The apparatus of claim 1 in which the removing the embedded degradation data restores the media signal to an original form prior to embedding of the degradation data.

4. The apparatus of claim 1 in which said processor is programmed for controlling rendering of the media signal.

5. An apparatus comprising:
    electronic memory for storing a media signal, the media signal comprising degradation introduced through use of a key, in which the key corresponds to detection criteria in the media signal, and in which the degradation comprises human perceptible degradation, the media signal further comprising the key embedded therein;

a processor programmed for:

analyzing the media signal to obtain the key; removing some of the degradation through use of the key, in which said removing utilizes different detection criteria relative to a process that introduced the degradation into the media signal.

6. The apparatus of claim 5 in which the media signal comprises audio or video.

7. The apparatus of claim 5 in which said processor is programmed for controlling rendering of the media signal.

8. The apparatus of claim 5 in which the media signal including the degradation comprises a signal suitable as a preview of the media signal.

* * * * *